May 26, 1931.  A. J. GALLAGHER  1,807,400
CUP CONTAINER
Filed April 2, 1929

Inventor
A. J. Gallagher.
By
Attorney

Patented May 26, 1931

1,807,400

UNITED STATES PATENT OFFICE

ARTHUR J. GALLAGHER, OF WARREN, OHIO

CUP CONTAINER

Application filed April 2, 1929. Serial No. 351,983.

This invention relates to a container for coffee and tea cups and other drinking vessels, and has for one of its objects to provide a novel, simple and inexpensive device of this character which shall be adapted to house and protect the cups from dust and other foreign matter, which shall be adapted to support the cups in stacked rows, and from which the cups may be readily removed one at a time.

With the foregoing and other objects in view, the nature of which will appear as the description proceeds, the invention consists of the construction, combination and arrangement of parts hereinafter fully described and claimed, and illustrated in the accompanying drawings wherein:

Figure 1:
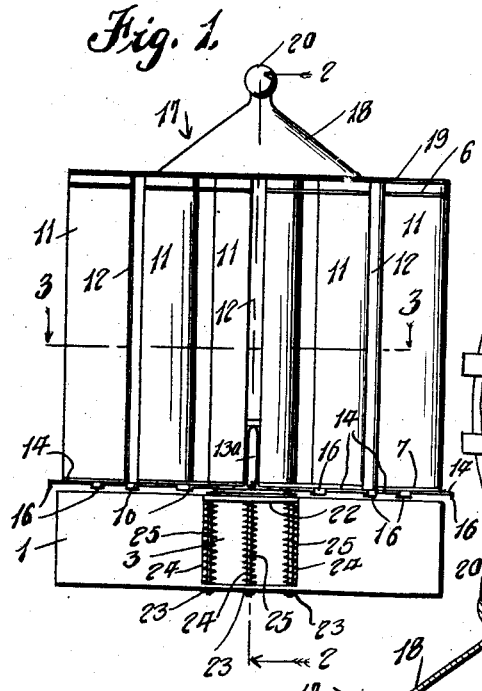
Figure 1 is a view in front elevation of the cup container.
Figure 3:
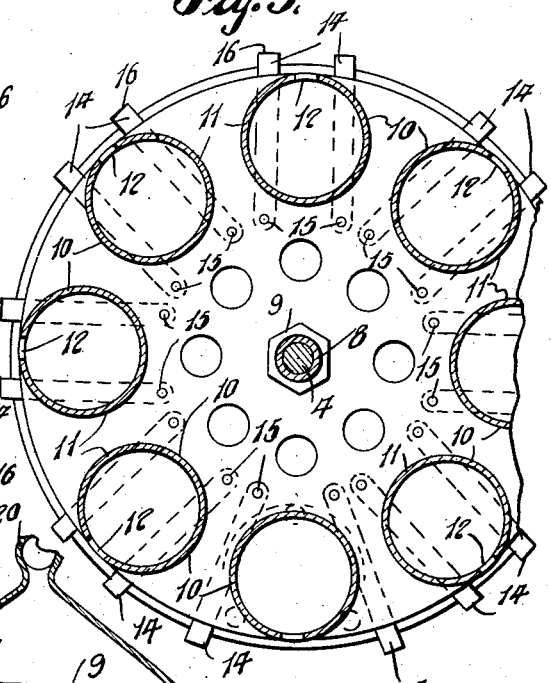
Figure 3 is a sectional view taken on the horizontal plane indicated by the line 3—3 of Figure 1.
Figure 2:
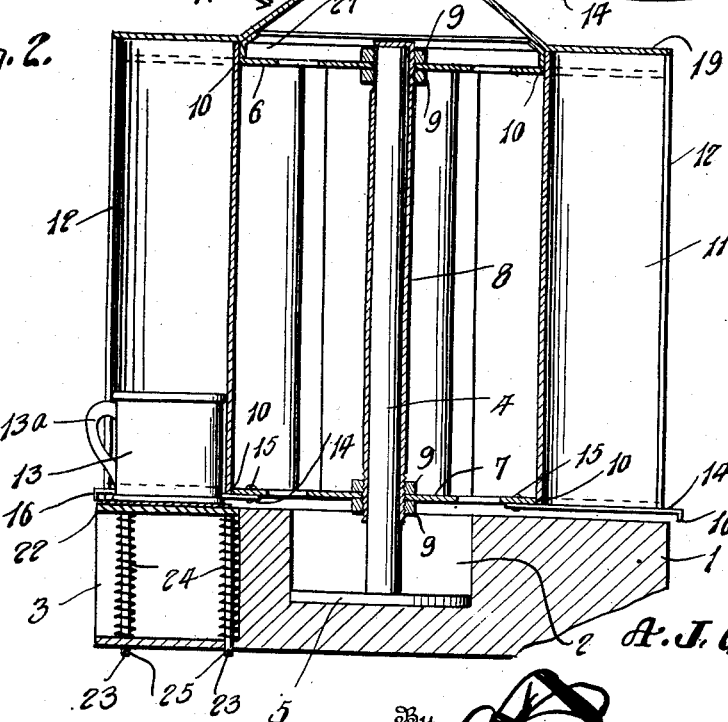
Figure 2 is a sectional view taken on the vertical plane indicated by the line 2—2 of Figure 1.

The cup container comprises a base 1 which is preferably of cylindrical formation and provided with recesses 2 and 3. The recess 2 is located centrally of the base 1 and opens out through the upper side thereof. The recess 3 is located outwardly beyond the recess 2 and opens out through the top and front sides of the base 1. A shaft 4 which extends vertically from the base 1, is provided at its lower end with a disk 5 which is positioned upon and is secured to the bottom wall of the recess 2.

A frame which consists of a top disk 6, a bottom disk 7 and a tube 8, is rotatably supported upon the shaft 4 through the medium of the tube. The tube 8 passes through the centers of the disks 6 and 7, and these parts are connected together by nuts 9 which are engaged with the tube and contact with the upper and lower surfaces of the disks. The upper end of the tube 8 is closed and rests upon the upper end of the shaft 4 and supports the frame upon the shaft with the bottom disk 7 in spaced relation to the upper surface of the base 1. The disks 6 and 7 are provided with an annular series of openings 10 in which are positioned tubes 11. The openings 10 extend through the peripheries of the disks 6 and 7, and the tubes are provided in their outer sides with slots 12. The tubes 11 are secured in any suitable manner to the disks 6 and 7 with their lower ends in alinement with the lower surface of the disk 7 and with their upper ends extending slightly above the disk 6. The tubes 11 are fully open at their upper and lower ends, and the slots 12 extend throughout the entire length thereof. The cups 13 are adapted to be arranged one upon the other within the tubes 11, and they are supported within the tubes by bars 14 which extend across the lower ends of the tubes. The bars 14 are positioned beneath the disk 7 and are pivoted at their inner ends as at 15 to said disk. The bars 14 extend outwardly beyond the disk 7 and have their outer ends turned down as shown at 16. The handles 13ª of the cups 13 extend through the slots 12 of the tubes 11.

The container is provided with a cover 17 which is removable to permit the cups 13 to be placed in the tubes 11. The cover 17 comprises a central conical portion 18 and a horizontally disposed annular portion 19 extending outwardly from the base of the conical portion. The conical portion 18 overlies the central portion of the frame, and it is provided at its upper end with a handle or knob 20. The annular portion 19 overlies the upper ends of the tubes 11. The cover 17 is provided at the base of its conical portion 18 with an inner annular flange 21 which contacts with the inner sides of the tubes 11 and prevents the accidental displacement of the cover.

A plate 22 is supported for vertical sliding movement in the recess 3 of the base 1 by rods 23 which are secured at their upper ends to the plate and pass through openings in the bottom wall of the recess. Springs 24 which are mounted upon the rods 23 between the bottom wall of the recess 3 and the plate 22, yieldingly support the plate with its upper surface in alinement with the corresponding surface of the base 1. The movement of the plate 22 under the influence of the springs 24 is limited by pins 24 carried by the rods 23 and contacting with the under side of the base 1 when the plate is in normal position.

The cup container is especially adapted for use in lunch rooms and the like, and in practice it will be placed upon the counter in a convenient position with respect to the coffee urn. The base 1 may be secured to the counter in any suitable manner. The frame carrying the tubes 11 is rotatably adjusted with respect to the base 1 so as to position one of the tubes directly above the plate 22. The bars 14 of this tube are then swung laterally beyond the lower end of the tube so as to permit the cups 13 arranged within the tube to be supported by the plate 22. When it is desired to remove one of the cups 13, the lowermost cup, which is resting directly upon the plate 22, is moved downwardly through the medium of its handle 13ª until it is arranged wholly within the recess 3, and it is thereafter withdrawn from the open front side of the recess. The depth of the recess 3 is slightly greater than the corresponding dimension of the cups 13 so as to permit the lowermost cup to be moved downwardly below the lower end of its tube 11 during the act of withdrawing it from the container. After the withdrawal of the cup 13, the remaining cup or cups in the tube 11 will move downwardly until their motion is arrested by the plate 22 so as to position another cup for withdrawal from the container. After all of the cups 13 have been removed from the tube 11 positioned directly above the plate 22, the frame carrying the tubes 11 is again rotatably adjusted with respect to the base 1 so as to position another cup retaining tube directly above the plate. If desired the container may embody several of the tube carrying frames so as to permit an empty frame to be quickly replaced by a full one and thus avoid delay in serving the customers of the lunch room especially during rush hours.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A cup container comprising a spring supported plate, a series of cup carrying tubes provided with slots through which the handles of the cups extend, pivoted bars extending across the lower ends of the tubes, and means for rotatably supporting the tubes to permit them to be successively alined with the plate.

2. A cup container comprising a base provided with a recess, a spring supported plate within the recess, a series of cup carrying tubes provided with slots through which the handles of the cups extend, pivoted bars extending across the lower ends of the tubes, and means rotatably supporting the tubes on the base to permit them to be successively alined with the plate.

3. A cup container comprising a base provided with a recess, a spring supported plate within the recess, a shaft supported by the base, a tube rotatably mounted upon the shaft and provided with disks, cup carrying tubes carried by the disks and provided with slots through which the handles of the cups extend, pivoted bars extending across the lower ends of the tubes, and a cover for the upper ends of the tubes.

In testimony whereof I affix my signature.

ARTHUR J. GALLAGHER.